(12) United States Patent
Chang (10) Patent No.: US 7,513,673 B2
(45) Date of Patent: Apr. 7, 2009

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 105 days.

(21) Appl. No.: 11/550,379

(22) Filed: Oct. 17, 2006

(65) Prior Publication Data
US 2008/0037281 A1 Feb. 14, 2008

(30) Foreign Application Priority Data
Aug. 11, 2006 (CN) .......................... 2006 1 0062078

(51) Int. Cl.
*F21V 7/04* (2006.01)
(52) U.S. Cl. .................... 362/618; 362/246; 362/627
(58) Field of Classification Search .................. 362/29, 362/30, 240, 246, 330, 607, 608, 612, 613, 362/618, 624, 627
See application file for complete search history.

(56) References Cited

U.S. PATENT DOCUMENTS

| | | | | |
|---|---|---|---|---|
| 3,351,753 | A * | 11/1967 | Berger | 362/327 |
| 5,377,084 | A * | 12/1994 | Kojima et al. | 362/618 |
| 5,971,559 | A | 10/1999 | Ishikawa et al. | |
| 6,913,365 | B2 | 7/2005 | Masaki et al. | |
| 6,979,112 | B2 | 12/2005 | Yu et al. | |
| 7,255,456 | B2 | 8/2007 | Yao et al. | |
| 7,255,462 | B2 | 8/2007 | Tseng | |
| 2006/0001793 | A1 | 1/2006 | Nitto et al. | |
| 2006/0104084 | A1* | 5/2006 | Amemiya et al. | 362/561 |
| 2006/0109682 | A1* | 5/2006 | Ko et al. | 362/607 |
| 2007/0114566 | A1 | 5/2007 | Maruska et al. | |
| 2007/0133095 | A1 | 6/2007 | Bruzzone et al. | |
| 2007/0171671 | A1 | 7/2007 | Kurokawa et al. | |
| 2007/0263408 | A1* | 11/2007 | Chua | 362/612 |
| 2007/0263412 | A1 | 11/2007 | Lee | |
| 2007/0285785 | A1 | 12/2007 | Lin | |
| 2008/0030994 | A1 | 2/2008 | Chang | |
| 2008/0037274 | A1 | 2/2008 | Chang | |
| 2008/0043455 | A1 | 2/2008 | Chang | |
| 2008/0043493 | A1 | 2/2008 | Chang | |

FOREIGN PATENT DOCUMENTS

| | | |
|---|---|---|
| CN | 1779522 | 5/2006 |
| JP | 2003-241191 | 6/2003 |

* cited by examiner

*Primary Examiner*—John A Ward
(74) *Attorney, Agent, or Firm*—Steven M. Reiss (57) ABSTRACT

An exemplary optical plate (30) includes a transparent plate (321) and a light diffusion layer (322). The transparent plate includes a light output surface (3213), a light input surface (3211) opposite to the light output surface, and a plurality of elongated depressions (3215) formed on the light input surface. The light diffusion layer is coated on the light input surface and filled with the elongated depressions. The light diffusion layer covers the light input surface. The tight diffusion layer includes transparent resin matrix material, first light diffusion particles and second light diffusion particles dispersed in the transparent resin matrix material uniformly. A refractive index of the second light diffusion particles is greater than that of the first light diffusion particles. A backlight module using the present optical plate is also provided. The present backlight module using the optical plate can have a thin body with a good optical performance.

17 Claims, 9 Drawing Sheets

OPTICAL PLATE AND BACKLIGHT MODULE USING THE SAME

This application is one of four co-pending U.S. patent applications, which is: application Ser. No. 11/550,379, filed on Oct. 17, 2006, and entitled "OPTICAL PLATE AND BACKLIGHT MODULE USING THE SAME"; application Ser. No. 11/557,914, filed on Nov. 08, 2006, and entitled "OPTICAL PLATE AND BACKLIGHT MODULE USING THE SAME"; application Ser. No. 11/565,575, filed on Nov. 30, 2006, and entitled "OPTICAL PLATE WITH DIFFUSION LAYER AND BACKLIGHT MODULE USING THE SAME"; application Ser. No. 11/566,836, filed on Dec. 05, 2006, and entitled "OPTICAL PLATE WITH DIFFUSION LAYER AND BACKLIGHT MODULE USING THE SAME". In the applications, the inventors are Shao-Han Chang. The applications have the same assignee as the present application. The disclosure of the above identified application is incorporated herein by reference.

BACKGROUND OF THE INVENTION

1. Field of the Invention

The present invention relates to optical plates and more particularly to an optical plate and a backlight module using the optical plate, which apparatuses are for use in, for example, a liquid crystal display (LCD).

2. Discussion of the Related Art

In a liquid crystal display device, liquid crystal is a substance that does not itself radiate light. Instead, the liquid crystal relies on light received from a light source, in order that the liquid crystal can provide displaying of images and data. In the case of a typical liquid crystal display device, a backlight module powered by electricity supplies the needed light.

Figure 8:
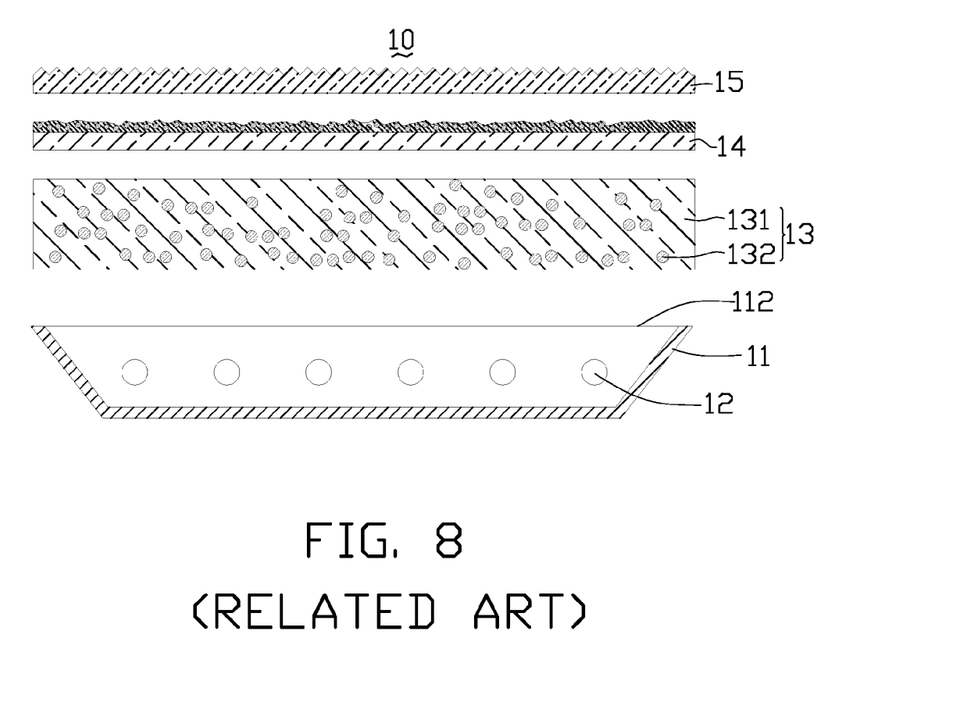
FIG. 8 is an exploded, side cross-sectional view of a conventional backlight module.
Figure 9:
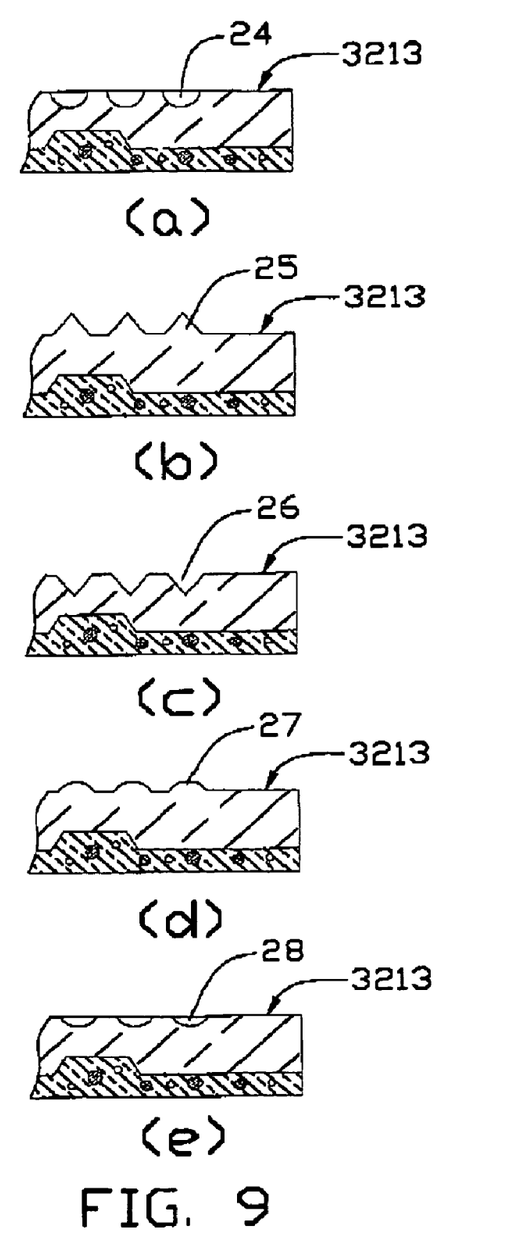
FIGS. 9(a) to 9(e) are partially, side cross-sectional views of five optical plates in accordance with sixth to tenth embodiments of the present invention.

FIG. 8 represents a typical direct type backlight module 10. The backlight module 10 includes a housing 11, a plurality of lamp tubes 12, a light diffusion plate 13, a light diffusion sheet 14, and a prism sheet 15. The housing 11 has an opening 112 located at a top thereof. The light diffusion plate 13, the light diffusion sheet 14 and the prism sheet 15 are stacked in that order on the housing 11 above the opening 112. The lamp tubes 12 are positioned in the housing 11 under the light diffusion plate 13. Light rays emitted from the lamp tubes 12 are substantially diffused in the light diffusion plate 13, and finally surface light rays are output from the prism sheet 15.

However, to enhance the uniformity of light rays output by the backlight module 10, there must be a certain space between the light diffusion plate 13 and the lamp tubes 12. This space eliminates potential dark strips caused by the reduced intensity of light between adjacent lamp tubes 12. Therefore the backlight module 10 may be unduly thick, and the intensity of luminance is reduced. Alternatively, the light diffusion plate 13 can be constructed to have sufficient thickness to thoroughly diffuse light passing therethrough. In such case, the thickness is typically required to be in the range of about 2 to 3 centimeters.

In addition, the light diffusion plate 13 is typically manufactured by uniformly dispersing a plurality of light diffusion particles 132 into a transparent resin matrix material 131. Since numerous light rays are diffused by the light diffusion particles 132 a number of times in the light diffusion plate 13, an amount of the light energy is lost, and a brightness of light output by the backlight module 10 is decreased.

Furthermore, the light diffusion plate 13, the light diffusion sheet 14, and the prism sheet 15 are in contact with each other, but with a plurality of air pockets existing at the boundaries therebetween. When the backlight module 10 is in use, light rays pass through the air pockets, and some of the light rays undergo total reflection at one or another of the corresponding boundaries. Thus the light energy utilization ratio of the backlight module 10 is reduced.

What is needed, therefore, is a new optical plate and a backlight module using the optical plate that can overcome the above-mentioned shortcomings.

SUMMARY

An optical plate according to a preferred embodiment includes a transparent plate and a light diffusion layer. The transparent plate includes a light output surface, a light input surface opposite to the light output surface, and a plurality of elongated depressions formed on the light input surface. The light diffusion layer is coated on the light input surface and the elongated depressions.

A backlight module according to a preferred embodiment includes a housing, a plurality of lamp tubes, and an optical plate. The same optical plate as described in the previous paragraph is employed in this embodiment. The housing includes a base and a plurality of sidewalls extending from a periphery of the base, the base and the sidewalls cooperatively forming an opening. The optical plate is positioned on the opening. The lamp tubes are regularly disposed in the housing underneath the optical plate positioned in one-to-one correspondence with the elongated depressions.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
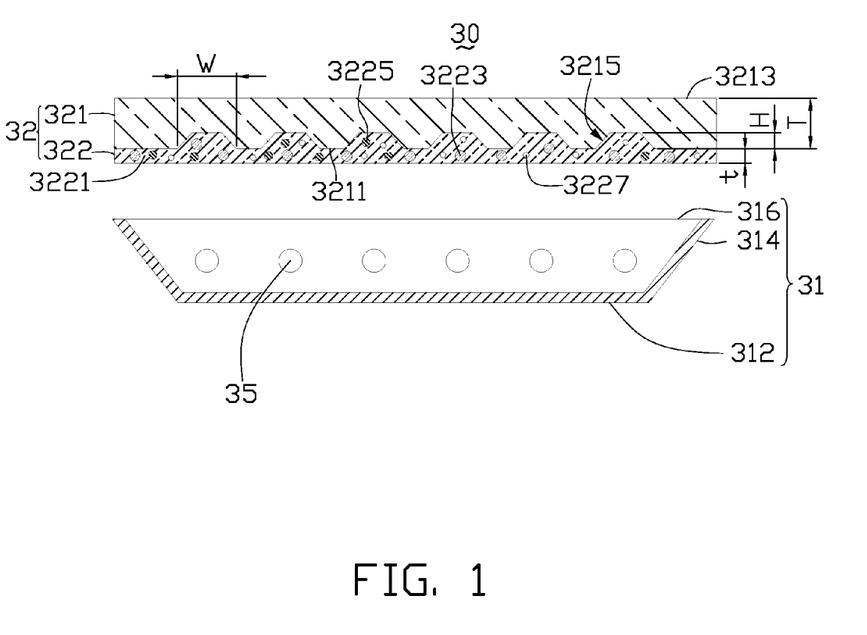
FIG. 1 is an exploded, side cross-sectional view of a backlight module using an optical plate according to a first preferred embodiment of the present invention.
Figure 2:
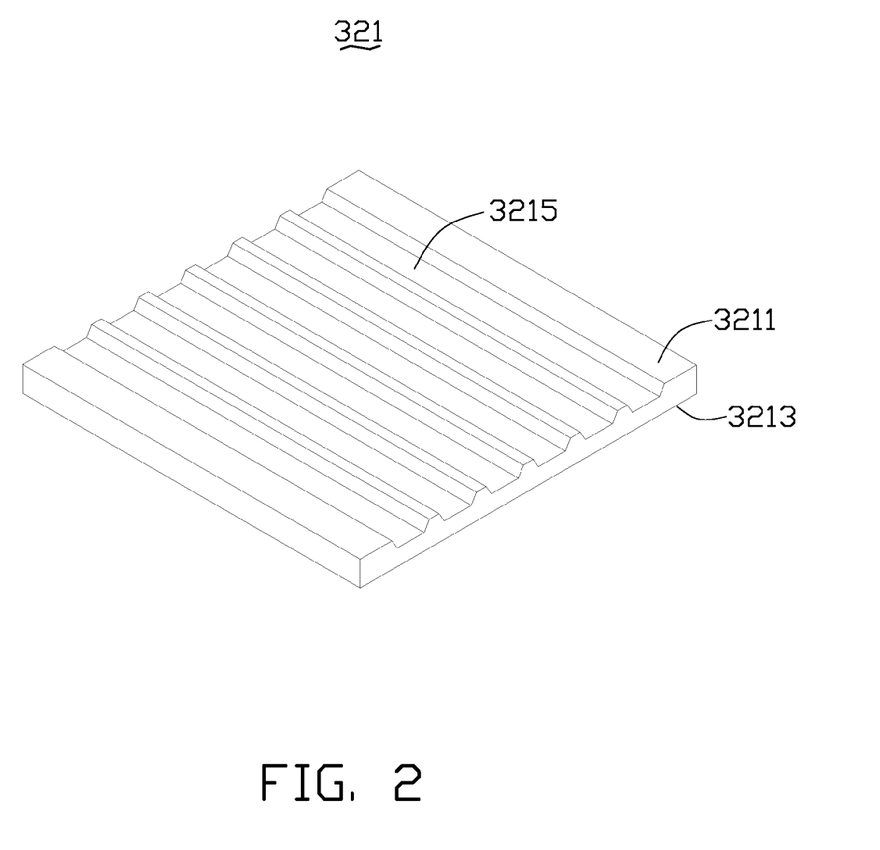
FIG. 2 is an isometric, inverted view of a transparent plate of the optical plate of FIG. 1.

Referring to FIGS. 1 and 2, a backlight module 30 in accordance with a first preferred embodiment is shown. The backlight module 30 includes a housing 31, an optical plate 32, and a plurality of lamp tubes 35. The housing 31 includes a base 312 and a plurality of sidewalls 314 extending from a periphery of the base 312, with the base 312 and the sidewalls 314 cooperatively defining an opening 316. The lamp tubes 35 are positioned in the housing 31. The lamp tubes 35 are typically cold cathode fluorescent lamps. The optical plate 32 is positioned on top of the housing 31 above the opening 316. Light rays emitted from the lamp tubes 35 are substantially diffused in the optical plate 32, and finally surface light rays are output from the optical plate 32.

The optical plate 32 includes a transparent plate 321 and a light diffusion layer 322. The transparent plate 321 includes a light input surface 3211, and a light output surface 3213 opposite to the light input surface 3211. A plurality of elongated depressions 3215 is formed in the transparent plate 321 at the light input surface 3211. Each elongated depression 3215 extends along a direction parallel to a same side surface (not labeled) of the optical plate 32. In this embodiment, each elongated depression 3215 has an isosceles trapezoidal cross-section taken along a direction perpendicular to the side surface and the light output surface 3213. The light diffusion layer 322 is coated on the light input surface 3211 and the elongated depressions 3215 (see below). The light output surface 3213 of the transparent plate 321 and an outer surface (not labeled) of the light diffusion layer 322 are both flat surfaces. The lamp tubes 35 are regularly arranged parallel to each other under the optical plate 32, and are located in one-to-one correspondence with the elongated depressions 3215.

Also referring to FIG. 2, the transparent plate 321 can be made from material selected from the group consisting of polycarbonate (PC), polymethyl methacrylate (PMMA), polystyrene (PS), copolymer of methylmethacrylate and styrene (MS), and any suitable combination thereof. A maximum thickness T of the transparent plate 321 is configured to be in the range from 1.0 millimeter to 6.0 millimeters. In consideration of light diffusing effects, a ratio of a depth H of the elongated depressions 3215 to the thickness T of the transparent plate 321 is preferably less than 30 percent. Thus, the depth H is configured to be in the range from about 0 millimeters to about 2.4 millimeters.

The light diffusion layer 322 includes, by weight, transparent resin matrix material in an amount of 5 to 90 percent, and first and second light diffusion particles 3223, 3225 in an amount of 10 to 95 percent. The first and second light diffusion particles 3223, 3225 are dispersed in the transparent resin matrix material 3221 uniformly. A ratio by weight of the first light diffusion particles 3223 to the second light diffusion particles 3225 is in the range from 5 to 100.

The light diffusion layer 322 is manufactured by solidifying a varnish into which the first and second light diffusion particles 3223, 3225 have been dispersed. The varnish can be selected from the group consisting of acrylic varnish, acrylic amine varnish, epoxy resin varnish, and any suitable combination thereof. Accordingly, the transparent resin matrix material 3221 may be made of material selected from the group consisting of acrylic, acrylic amine, epoxy resin, and any suitable combination thereof.

A refractive index of the second light diffusion particles 3225 is larger than that of the first light diffusion particles 3223. The refractive index of the first light diffusion particles 3223 is typically in the range from about 1.4 to about 1.7. The refractive index of the second light diffusion particles 3225 is larger than 2.0, and is preferably in the range from about 2.0 to about 2.8. A diameter of the first light diffusion particles 3223 is larger than that of the second light diffusion particles 3225. The diameter of the first light diffusion particles 3223 is typically in the range from about 1 micron to 500 microns, and the diameter of the second light diffusion particles 3225 is typically in the range from about 0.01 microns to about 1 micron.

The first light diffusion particles 3223 can typically diffuse the light rays from the lamp tubes 35 before the second light diffusion particles 3225. The second light diffusion particles 3225 may further diffract and reflect the light rays, due to theirs smaller size and larger refractive index relative to the first light diffusion particles 3223. Thus the light diffusion layer 322 has good light diffusion capability with the cooperative effects between the first and second light diffusion particles 3223, 3225. Therefore, the thickness of the light diffusion layer 322 of the optical plate 32 may be configured to be very thin, with relatively uniform light diffusion of the optical plate 32 still being achieved.

In this embodiment, in order to attain good light diffusion effects, a minimum thickness t of the light diffusion layer 322 is configured to be greater than 15% of T. Thus, the thickness t is greater than or equal to 0.15 millimeters. In addition, because the lamp tubes 35 are positioned corresponding to the elongated depressions 3215, a thickness of portions of the light diffusion layer 322 above the lamp tubes 32 is greater than that of other portions of the light diffusion layer 322. Thus, the portions of the optical plate 32 above the lamp tubes 35 have relatively low illumination corresponding to their relatively close proximity to the lamp tubes 35. Accordingly, a distance from the lamp tubes 35 to the optical plate 32 may be configured to be very close, with little or no risk of dark strips occurring due to the reduced intensity of light between adjacent lamp tubes 35. Accordingly, the backlight module 30 can have a thin configuration while still providing good, uniform optical performance.

The first light diffusion particles 3223 may be selected from the group consisting of polystyrene (PS) particles, polycarbonate (PC) particles, styrene acrylonitrile copolymer particles, polypropylene particles, polymethyl methacrylate (PMMA) particles, glass beads, silicon dioxide ($SiO_2$) particles, quartz particles, and any suitable combination thereof. The second light diffusion particles 3225 may be selected from the group consisting of titanium dioxide ($TiO_2$) particles, barium sulfate ($BaSO_4$) particles, zinc sulfide (ZnS) particles, zinc oxide (ZnO) particles, antimony oxide ($Sb_2O_3$ or $Sb_2O_5$) particles, calcium carbonate ($CaCO_3$) particles, and any suitable combination thereof.

When the lamp tubes 35 are cold cathode fluorescent lamps, a significant amount of ultraviolet rays are unavoidably produced in operation. Since the transparent plate 321 of the optical plate 32 is formed of transparent synthetic resin material, the transparent plate 321 may be subject to color change and physical transformation problems due to the effects of long-term irradiation by the ultraviolet rays. In particular, the long-term radiation is liable to cause serious problems relating to bad optical uniformity, poor brightness, and worsening optical performance of the backlight module 30. In order to circumvent, resolve or mitigate these potential problems, the light diffusion layer 322 further includes a plurality of fluorescent particles 3227 uniformly dispersed in the transparent resin matrix material 3221 along with the first and second light diffusion particles 3223 and 3225. A ratio by weight of the fluorescent particles 3227 to the first light diffusion particles 3223 is preferably less than 1 percent. When ultraviolet rays irradiate the fluorescent particles 3227, a significant amount of the ultraviolet rays are converted into visible light and infrared light. Therefore, the light energy of utilization rate of the backlight module 30 is increased.

Figure 3:
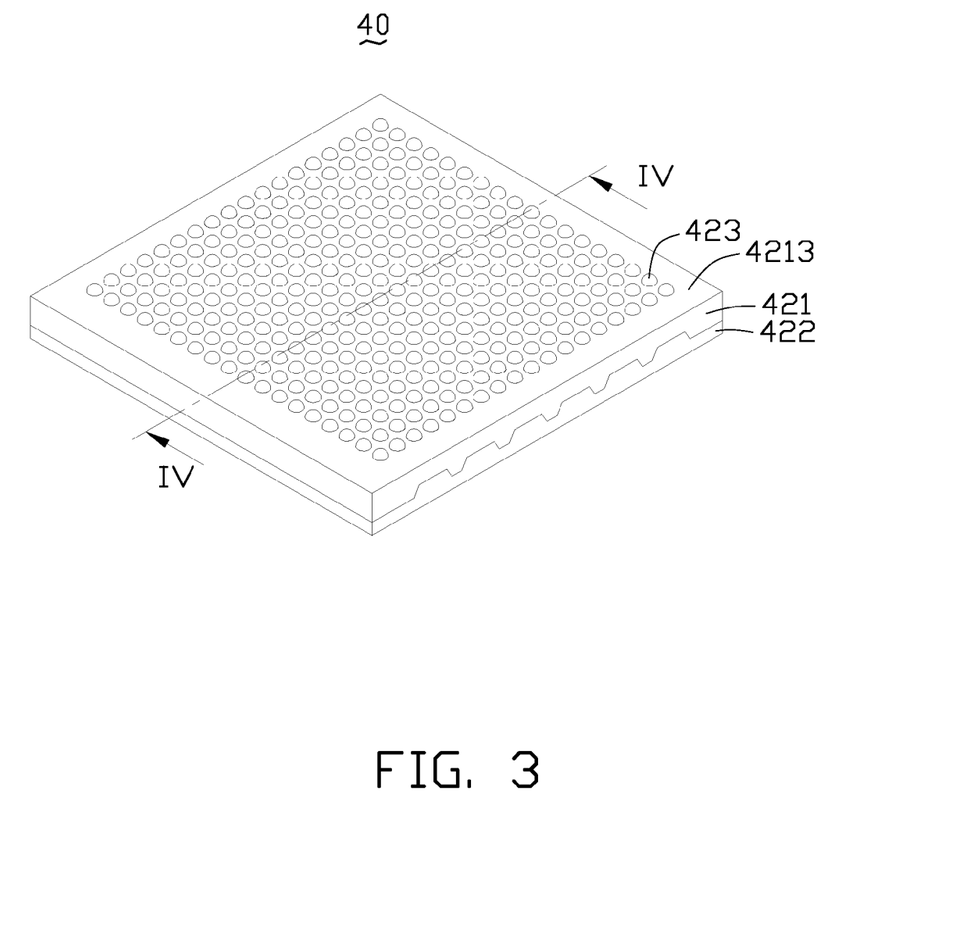
FIG. 3 is an isometric view of an optical plate according to a second preferred embodiment of the present invention.
Figure 4:
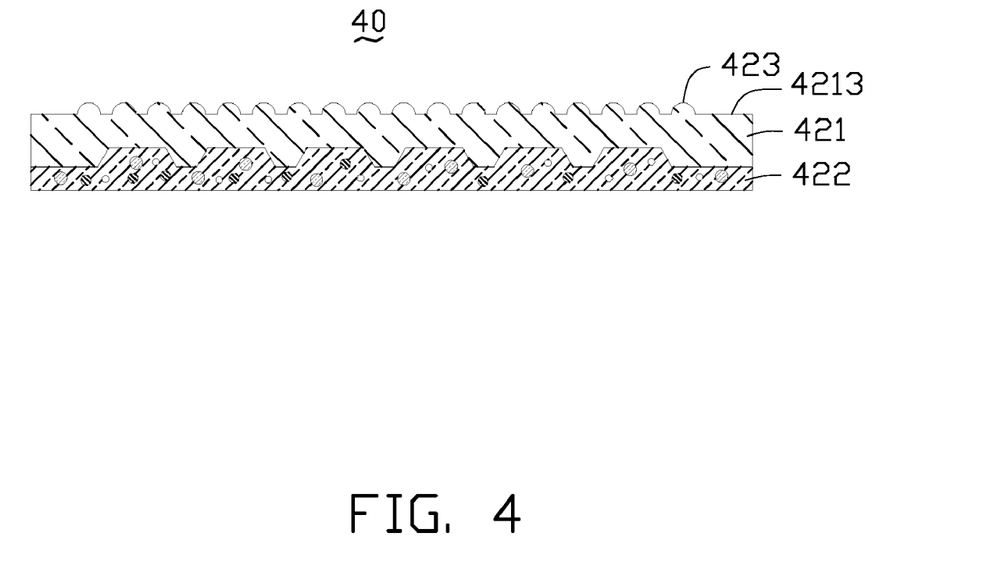
FIG. 4 is a cross-sectional view taken along line IV-IV of FIG. 3.

Referring to FIGS. 3 and 4, an optical plate 40 in accordance with a second preferred embodiment is shown. The optical plate 40 is similar in principle to the optical plate 32 of the first embodiment, except that the optical plate 40 further includes a plurality of hemispherical protrusions 423 formed on a light output surface 4213 of a transparent plate 421 thereof. The hemispherical protrusions 423 are arranged separately from each other in a regular matrix on the light output surface 4213. A diameter of each hemispherical protrusion 423 is configured to be in the range from about 10 microns to about 500 microns. The transparent plate 421 and the hemispherical protrusions 423 may be integrally manufactured as a single body by injection molding. When the optical plate 40 is utilized in a backlight module, light rays from lamp tubes (not shown) enter the optical plate 40. The light rays are substantially diffused in a light diffusion layer 422 of the optical plate 40. Many or most of the light rays are condensed by the hemispherical protrusions 423 of the optical plate 40 before they exit the light output surface 4213. Thereby, a brightness of the backlight module is to increased.

In this embodiment, the optical plate 40 may replace a light diffusion plate and a prism sheet that are ordinarily used in a backlight module. Therefore, air pockets that would ordinarily exist in the backlight module are eliminated, and loss of light energy in the backlight module is reduced. In addition, because the single optical plate 40 can be used in place of both a light diffusion plate and a prism sheet, the cost of the backlight module is also reduced.

Figure 5:
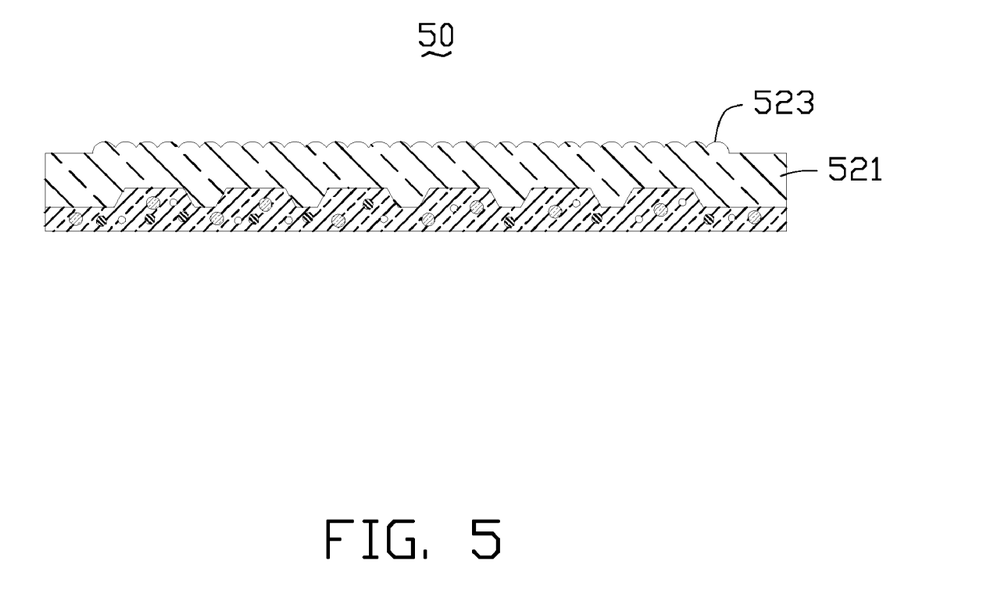
FIG. 5 is a side cross-sectional view of an optical plate according to a third preferred embodiment of the present invention.

Referring to FIG. 5, an optical plate 50 in accordance with a third preferred embodiment is shown. The optical plate 50 is similar in principle to the optical plate 40 of the second embodiment, except that hemispherical protrusions 523 of a transparent plate 521 of the optical plate 50 are all interconnected with one another to form a regular, continuous, microstructure pattern. Many or most of light rays passing through the transparent plate 521 are condensed by the hemispherical protrusions 523 before they exit the optical plate 50. Thereby, a brightness of a corresponding backlight module is increased.

In an alternative embodiment, prism lens structures may also be formed on the light output surface of the transparent plate of the optical plate instead of the hemispherical protrusions. The prism lens structures can be configured for increasing the brightness of a corresponding backlight module. Further, the optical plate is not limited to the above-described embodiments. For example, referring to FIGS. 9(a)-9(e), the optical plate may further include other suitable brightness enhancement structures formed on the light output surface 3213 thereof, such as hemispherical grooves 24, V-shaped protrusions 25, V-shaped grooves 26, arc-shaped protrusions 27, arc-shaped grooves 28, and the like.

Figure 6:
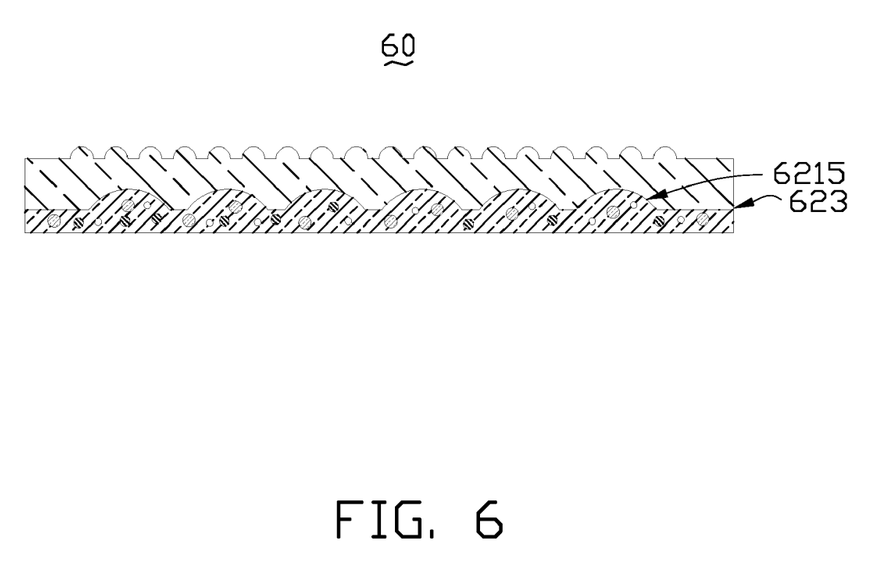
FIG. 6 is a side cross-sectional view of an optical plate according to a fourth preferred embodiment of the present invention.

Referring to FIG. 6, an optical plate 60 in accordance with a fourth preferred embodiment is shown. The optical plate 60 is similar in principle to the optical plate 40 of the second embodiment, except that each of elongated depressions 6215 has an arc-shaped or arcuate cross-section taken along a direction perpendicular to a side surface 623. The elongated depressions 6215 extend along a direction parallel to the side surface 623.

Figure 7:
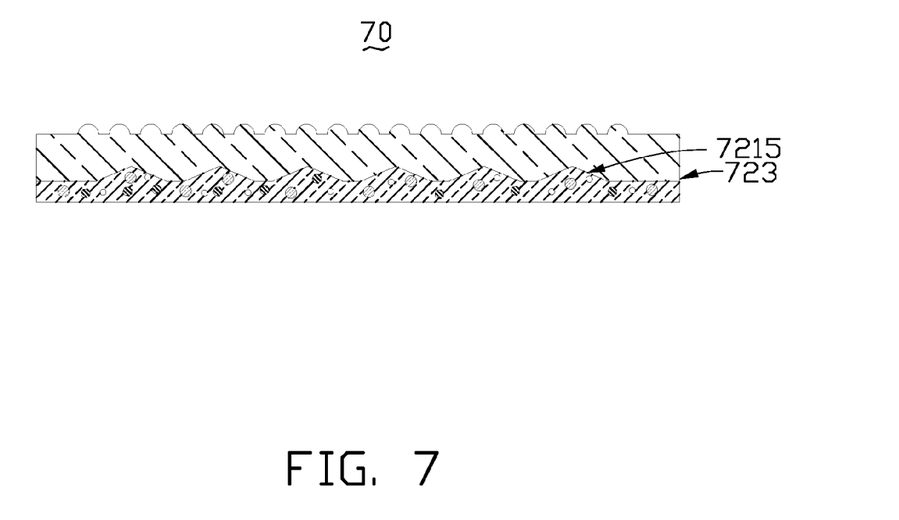
FIG. 7 is a side cross-sectional view of an optical plate according to a fifth preferred embodiment of the present invention.

Referring to FIG. 7, an optical plate 70 in accordance with a fifth preferred embodiment is shown. The optical plate 70 is similar in principle to the optical plate 32 of the first embodiment, except that each of elongated depressions 7215 has a triangular cross-section taken along a direction perpendicular to a side surface 723. The elongated depressions 7215 extend along a direction parallel to the side surface 723. In this embodiment, the triangular cross-section of each elongated depression 7215 is an isosceles triangle.

It is noted that the scope of the present optical plate is not limited to the above-described embodiments. Various numbers and shapes of depressions, lamp tubes and brightness enhancement structures have been described and illustrated for the purposes of conveniently demonstrating various principles of the present invention.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   a transparent plate having:
   a light output surface,
   a light input surface opposite to the light output surface, and
   a plurality of elongated depressions formed at the light input surface, and
   a light diffusion layer coated on the light input surface and the elongated depressions, wherein the light diffusion layer cover the light input surface completely, wherein the light diffusion layer comprises transparent resin matrix material, first light diffusion particles and second light diffusion particles dispersed in the transparent resin matrix material uniformly, and a refractive index of the second light diffusion particles is greater than that of the first light diffusion particles.

2. The optical plate according to claim 1, wherein each elongated depression extends along a direction parallel to one side surface of the optical plate.

3. The optical plate according to claim 2, wherein each elongated depression has one of the following cross-sections taken along a direction perpendicular to the side surface and the light output surface: triangular, trapezoidal, arcuate, or arc-shaped.

4. The optical plate according to claim 1, wherein the refractive index of the first light diffusion particles is in the range from about 1.4 to about 1.7, and the refractive index of the second light diffusion particles is greater than 2.0.

5. The optical plate according to claim 1, wherein the light diffusion layer comprises, by weight, the transparent resin matrix material in an amount of 5 to 90 percent, and the first and second light diffusion particles in an amount of 10 to 95 percent in total, and a ratio by weight of the first light diffusion particles to the second light diffusion particles is in the range from 5 to 100.

6. The optical plate according to claim 1, wherein the first light diffusion particles are selected from the group consisting of polystyrene particles, polycarbonate particles, styrene acrylonitrile copolymer particles, polypropylene particles, polymethyl methacrylate particles, glass beads, silicon dioxide particles, quartz particles, and any combination thereof.

7. The optical plate according to claim 1, wherein the second light diffusion particles are selected from the group consisting of titanium dioxide particles, barium sulfate particles, zinc sulfide particles, zinc oxide particles, antimony oxide particles, calcium carbonate particles, and any combination thereof.

8. The optical plate according to claim 1, wherein the light diffusion layer further comprises a plurality of fluorescent particles dispersed in the transparent resin matrix material, and a ratio by weight of the fluorescent particles to the first light diffusion particles is less than 1 percent.

9. The optical plate according to claim 1, further comprising a plurality of brightness enhancement structures formed at the light output surface thereof.

10. The optical plate according to claim 9, wherein the brightness enhancement structures are selected from the group consisting of hemispherical protrusions, hemispherical grooves, V-shaped protrusions, V-shaped grooves, arc-shaped protrusions, and arc-shaped grooves.

11. The optical plate according to claim 10, wherein the hemispherical protrusions are arranged separately from each other in a matrix.

12. The optical plate according to claim 10, wherein the hemispherical protrusions are interconnected with one another to form a continuous microstructure pattern.

13. A backlight module comprising:
a housing having a base and a plurality of sidewalls extending from a periphery of the base, the base and the sidewalls cooperatively forming an opening;
an optical plate disposed on the housing over the opening, the optical plate comprising:
a transparent plate having a light output surface, a light input surface opposite to the light output surface, and a plurality of elongated depressions formed on the light input surface; and
a light diffusion layer coated on the light input surface and the elongated depressions, the light diffusion layer covering the light input surface; and
a plurality of lamp tubes in the housing underneath the optical plate positioned in one-to-one correspondence with the elongated depressions, wherein the light diffusion layer comprises transparent resin matrix material, first light diffusion particles and second light diffusion particles dispersed in the transparent resin matrix material uniformly, and a refractive index of the second light diffusion particles is greater than that of the first light diffusion particles.

14. The backlight module according to claim 13, wherein each elongated depression extends along a direction parallel to one side surface of the optical plate.

15. The backlight module according to claim 14, wherein each elongated depression has one of the following cross-sections taken along a direction perpendicular to the side surface and the light output surface: triangular, trapezoidal, arcuate, or arc-shaped.

16. The backlight module according to claim 13, wherein the refractive index of the first light diffusion particles is in the range from about 1.4 to about 1.7, and the refractive index of the second light diffusion particles is greater than 2.0.

17. The backlight module according to claim 13, wherein the light diffusion layer comprises, by weight, the transparent resin matrix material in an amount of 5 to 90 percent, and the first and second light diffusion particles in an amount of 10 to 95 percent in total, and a ratio by weight of the first light diffusion particles to the second light diffusion particles is in the range from 5 to 100.

* * * * *